Jan. 6, 1925.  
G. R. WOOD  
MEAT SLICING MACHINE  
Filed May 31, 1923  
1,521,801  
2 Sheets-Sheet 1
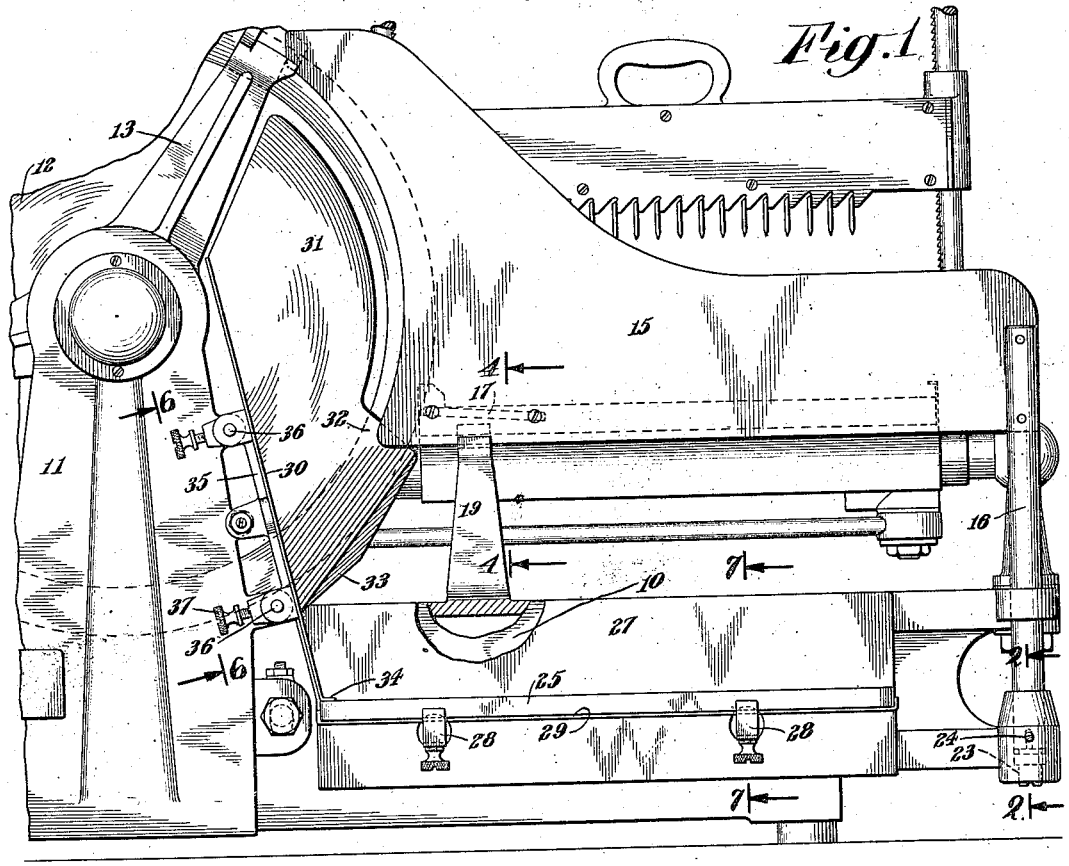

Jan. 6, 1925.  
G. R. WOOD  
MEAT SLICING MACHINE  
Filed May 31, 1923  
1,521,801  
2 Sheets-Sheet 2
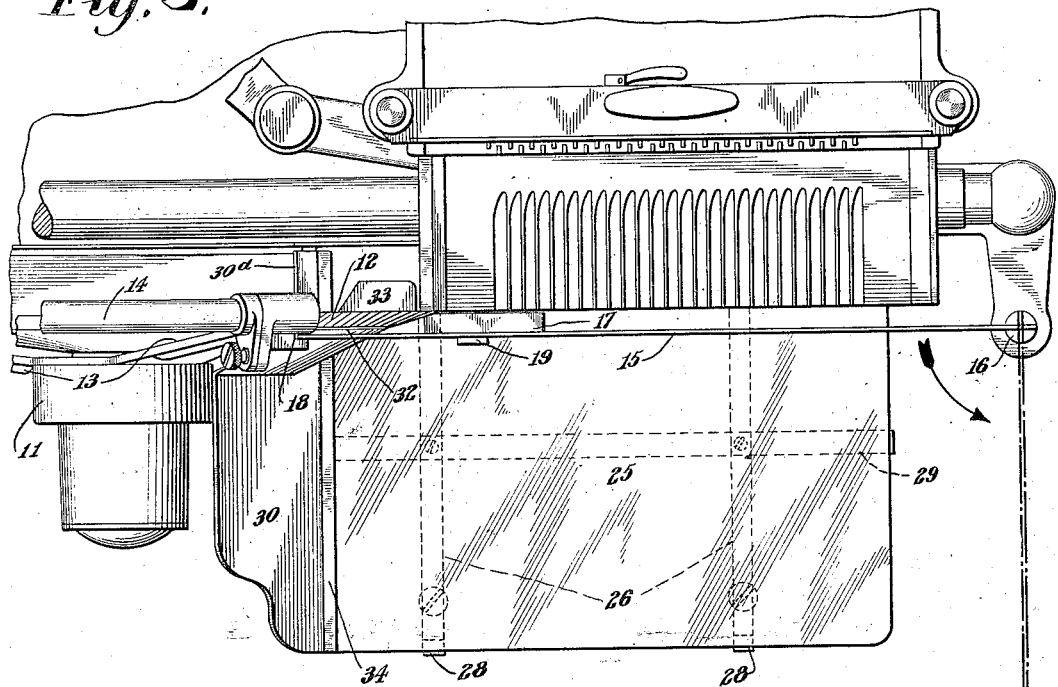
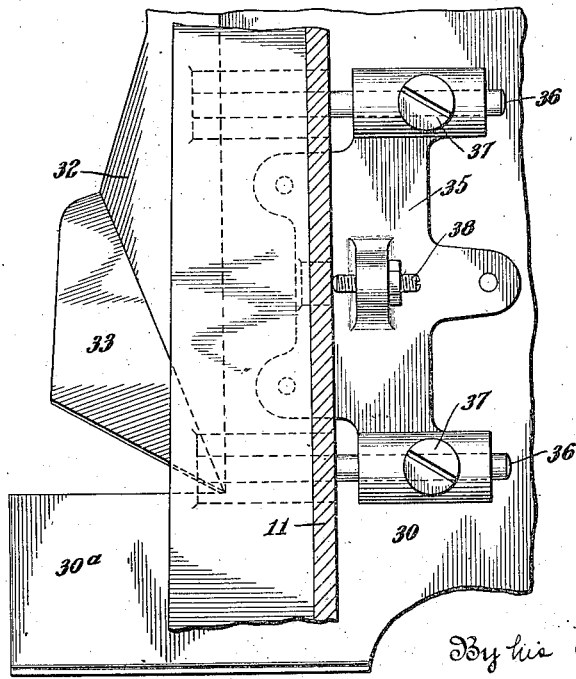
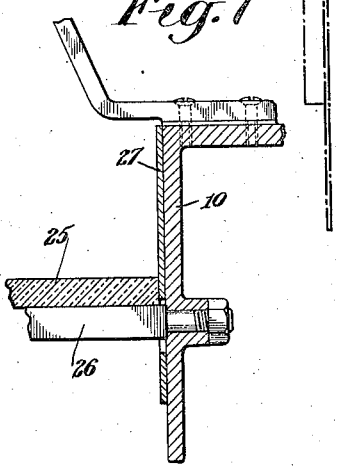
Inventor
George R. Wood
By his Attorneys
Cooper, Kerr & Dunham Patented Jan. 6, 1925.

1,521,801

UNITED STATES PATENT OFFICE.

GEORGE RUE WOOD, OF DAYTON, OHIO, ASSIGNOR TO DAYTON SCALE COMPANY, OF DAYTON, OHIO, A CORPORATION OF NEW JERSEY.

MEAT-SLICING MACHINE.

Application filed May 31, 1923. Serial No. 642,540.

*To all whom it may concern:*

Be it known that I, GEORGE R. WOOD, a citizen of the United States of America, residing at Dayton, in the county of Montgomery and State of Ohio, have invented certain new and useful Improvements in Meat-Slicing Machines, of which the following is a full, clear, and exact description.

This invention relates to improvements in meat slicers and is more particularly directed to the improvement of those parts and appurtenances which direct the meat to and away from the knife, certain of which also serve to guard the knife, and to the parts which receive the slices of meat.

The objects of the present invention reside in the simplification and improvement of such parts as heretofore employed to the general end that their cost of manufacture be reduced, second that the parts may be more readily removed or displaced for cleaning, and third that the guiding of the meat to the knife and the guiding of the slices away therefrom may be accomplished in a more efficient manner than heretofore.

Further objects and advantages will be more fully set forth in the accompanying specification and shown in the drawings, which by way of illustration show a preferred embodiment of the invention.

In the drawings,

Fig. 1 is a side elevation of a part of a meat slicer with my improvements applied thereto.

Fig. 2 is a detail sectional view of the knife guard supporting post, the section being taken on line 2—2 of Fig. 1.

Fig. 3 is a detail view of the means for supporting the nose portion of the plate like knife guard.

Fig. 4 is a detail sectional view taken on line 4—4 of Fig. 1 and showing the meat support and the supplemental means for retaining the plate like guard in position.

Fig. 5 is a top plan view of the parts shown in Fig. 1.

Fig. 6 is a detail view of the supporting parts for the meat shield. The section is taken on line 6—6 of Fig. 1.

Fig. 7 is a further detail sectional view, taken on line 7—7 of Fig. 1.

The meat slicer to which the improvements forming the subject matter of the present invention is more fully described in my copending application Serial No. 645,139, filed June 13, 1923.

The meat slicer includes the usual base casting 10, the knife pedestal 11 carrying the circular cutting knife 12, the multiarmed guard support 13 which is removably secured to the knife guarding member 14. These parts are similar to like parts in the Hopkinson and Maltby Patent No. 1,210,476, and in the Hopkinson and Thomas Patent No. 1,263,414.

For guarding the cutting periphery of the knife, a plate like guard 15 is provided which at the end remote from the knife is secured to a post 16. The plate carries a sloping meat support 17 which supports and guides the meat adjacent the cutting point. The guard is pivotally displaceable for cleaning as in the former constructions, but the spring catch for retaining the nose of the guard is done away with and a slot 18 provided in the guard support (see Fig. 3).

Supplemental means are also provided for supporting the plate 15 against lateral displacement which comprise a bracket 19 suitably fastened to the frame of the machine and slotted as shown at 20 to receive the lower edge of the plate guard. To displace the guard pivotally for cleaning, the plate 15 is lifted up (see dotted line arrow, Fig. 3), until the nose portion clears the slot 18 and until the lower edge clears the top of slotted bracket 19. Thereafter the guard may be swung anticlockwise as indicated by full line arrows in Figs. 3 and 5.

To support the post so as to permit lifting and swinging of the guard the construction shown in Fig. 2 is provided. Suitable lugs on the base casting are drilled to receive the post 16. The post adjacent its lower end is vertically slotted at 21 and also provided with circumferential grooves 22. A suitable set screw 24 projects into the vertical slot in the post. The vertical slot permits vertical lifting of the post to the dotted line position (Fig. 2). Thereafter the groove 22 permits the post to be rotated. With the meat support carried by the plate like guard it is important that the top of the support be disposed in the proper position with respect to the advancing meat. To adjust the relative vertical position of the support I provide an adjustment screw 23 which is threaded into the base casting and which abuts the bottom of the post. By advancing or retracting this screw the meat plate and support may be adjusted vertically to the desired position. In Fig. 4 it will be noted that suitable clearance is provided in slot 20 below the plate 15 to permit of vertical adjustment of the plate.

Meat tray.

To receive the slices of meat, I provide a meat tray comprising a plate 25 of glass or porcelain. This plate is removably supported upon bracket rods 26 which are supported by the base as shown in Fig. 1. I also provide a removable backing plate 27 which is slotted to permit the same to be passed over the rods 26 before the glass plate 27 is placed in position thereon.

By loosening clips 28 (Fig. 1) both the meat tray 25 and the backing plate may be removed for cleaning. To afford additional rigidity to the bars 26 I preferably fasten thereto a cross bar 29 having upturned ends forming clips which receive the meat tray.

Knife shield.

To shield the edge of the knife and to direct the slices of meat onto the tray I provide a sheet metal shield 30. This shield has a portion 31 extending closely adjacent the knife and terminating short of the cutting edge thereof, and a supplementary portion 32 extending beyond the cutting edge and turned over as shown at 33. The lower end of the main back plate 30 of the shield is also extended beyond the knife as shown at 30ª in Figs. 5 and 6. The main rear portion of the shield extends downwardly in front of the pedestal and has a lip 34 projecting over the edge of the tray 25, and continuing across the bottom of part 30ª. To support the shield and provide for the ready removal of the same from the machine I provide a bracket 35 having lugs drilled to receive studs 36 carried by the pedestal. The shield assembly may be clamped to these studs by means of hand screws 37.

To provide for a limiting stop which may be adjustable to vary the closeness of the shield and knife, I provide a set screw 38 which passes through a threaded lug upon the bracket and which is adapted to contact with the pedestal 11 as shown in Fig. 6. By properly adjusting this set screw the shield can be adjusted once for proper clearance with respect to the knife, and thereafter the proper spacing of the shield and knife will be secured whenever the shield is removed and replaced in position on the studs 36.

What I claim is—

1. In a meat slicing machine, having a base, a circular knife and a plate like guard for said knife, in combination, a post for supporting said guard, means for supporting said post to permit an initial elevation of the post and the guard carried thereby, said supporting means including provision for permitting the rocking of the post and of the guard after the said parts have been elevated vertically.

2. In a meat slicing machine having a circular knife, a supporting base and a plate like guard for said knife, a post carried by the plate guard and adjustably mounted upon said base, said post and mounting therefor having provisions for permitting the post to be initially elevated vertically and thereafter rocked pivotally.

3. In a meat slicing machine having a circular knife, a supporting base and a plate like guard for said knife, a pivotal mounting for said guard and means for retaining the guard in guarding position comprising a slotted member adapted to engage the sides of the plate, and from which the plate may be disengaged by a vertical displacement thereof.

4. In a meat slicing machine having a circular knife, a supporting base, and a plate like guard for said knife, a pivotal mounting for said guard and means for retaining the guard in guarding position comprising a plurality of slotted members adapted to engage the edges of said plate at a plurality of points whereby said plate is rigidly supported against lateral displacement, said plate being displaceable pivotally upon vertical elevation of the same clear of the slots in said members.

5. In a slicing machine having a circular knife, a plate like guard therefor, a support carried by said guard, and means for adjusting the vertical position of said plate whereby the meat support may be brought to the proper horizontal position for properly guiding the meat.

6. In a meat slicing machine having a circular knife and a plate like guard therefor, a meat support carried by said plate, a post for supporting the plate pivotally mounted in said base and vertically displaceable with respect thereto, and cooperating with said post for vertically adjusting its normal position and thereby adjusting the normal position of the meat support.

7. In a meat slicing machine having a base, bracket rods extending laterally from said base, a meat tray plate carried thereby, and a removable backing plate having apertures therein through which said bracket rods pass, said plate being disposed between the frame and the tray plate for the purpose described.

8. In a meat slicing machine having a base, a pedestal extending upwardly therefrom, a circular knife, a pair of studs extending from said pedestal, and a knife shield structure supported upon said studs.

9. In a slicing machine, in combination with a base, a pedestal supported thereby, a circular knife carried by said pedestal, a shield structure removably supported upon said pedestal, and supplementary means thereon for determining the setting of said shield with respect to the knife.

10. In a meat slicing machine, a knife shield formed of one piece of sheet metal and including a back plate portion, an integral portion extending adjacent the cutting periphery of the knife and spaced therefrom, and a turned over portion extending beyond the periphery of the knife and turned over across the cutting plane of the knife.

11. A knife shield for use in a meat slicing machine, comprising a back plate structure, a projecting portion in alignment therewith and extending beyond the cutting plane of the knife, a turned up portion extending toward the peripery of the knife, and a supplementary guarding portion below the last mentioned portion extending beyond the periphery of the knife and having a turned over edge which projects to the other side of the cutting plane of the knife.

12. In a meat slicing machine having a base and a pedestal, a circular knife carried thereby, a meat shield for said knife, and means for removably mounting said shield upon said pedestal and adjusting the position of the shield laterally with respect to said knife, said means comprising a setting device and supplemental means for locking the shield to the pedestal in the position determined by said setting device.

13. In a meat slicing machine, in combination with the base of the machine, a pivotally mounted plate like guard for said knife and a bracket member carried by the base and having provisions for abutting against the side of the plate like guard, at the bottom thereof, to restrain lateral displacement of the guard when meat is thrust against the same.

14. In a meat slicing machine having a pivotally mounted plate like guard for the knife, and means for retaining said guard in guarding position and for permitting the displacement of the same, comprising in combination with the base and other fixed parts of the machine, a pivotally mounted post supported for axial shifting movement and pivotal movement, said fixed parts including slots for receiving the plate guard and retaining the latter in guarding position, said guard being displaceable upon being elevated clear of said slots.

In testimony whereof I hereto affix my signature.

GEORGE RUE WOOD.